United States Patent
Cai et al.

(10) Patent No.: US 9,500,138 B1
(45) Date of Patent: Nov. 22, 2016

(54) TWIN-ENGINE ROTORCRAFTS AND LOAD POWER SHARING CONTROL SYSTEMS THEREOF AND METHODS FOR LOAD POWER SHARING CONTROL

(71) Applicant: United Technologies Corporation, Hartford, CT (US)

(72) Inventors: Chaohong Cai, Weatogue, CT (US); Michael H. Levesque, Cromwell, CT (US); Richard P. Meisner, Glastonbury, CT (US); Timothy J. Crowley, Tolland, CT (US); Joshua Adams, New Hartford, CT (US); Timothy J. Gaudet, Southampton, MA (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/828,367

(22) Filed: Aug. 17, 2015

(51) Int. Cl.
*F02C 9/54* (2006.01)
*B64D 31/12* (2006.01)
*B64C 27/12* (2006.01)
*G07C 5/08* (2006.01)

(52) U.S. Cl.
CPC ............. *F02C 9/54* (2013.01); *B64C 27/12* (2013.01); *B64D 31/12* (2013.01); *G07C 5/0808* (2013.01); *F05D 2220/329* (2013.01); *F05D 2270/052* (2013.01); *F05D 2270/301* (2013.01); *F05D 2270/3032* (2013.01); *F05D 2270/44* (2013.01)

(58) Field of Classification Search
CPC ....... F02C 9/54; B64D 31/12; G07C 5/0808; B64C 27/12; F05D 2220/329; F05D 2270/44; F05D 2270/052; F05D 2270/301; F05D 2270/3032
USPC ........................................... 701/100
See application file for complete search history.

(56) References Cited

U.S. PATENT DOCUMENTS

2012/0221156 A1  8/2012  Fuller et al.
2015/0113996 A1  4/2015  Cai et al.

*Primary Examiner* — Brian P Sweeney
(74) *Attorney, Agent, or Firm* — Snell & Wilmer, L.L.P.

(57) ABSTRACT

A load power sharing control system for a twin-engine rotorcraft having a first gas turbine engine and a second gas turbine engine is provided.

20 Claims, 6 Drawing Sheets

TWIN-ENGINE ROTORCRAFTS AND LOAD POWER SHARING CONTROL SYSTEMS THEREOF AND METHODS FOR LOAD POWER SHARING CONTROL

FIELD

The present disclosure relates to gas turbine engines, and more specifically, to twin-engine rotorcrafts and load power sharing control systems thereof and methods for load power sharing control for a twin-engine rotorcraft.

BACKGROUND

A twin-engine rotorcraft (e.g., a helicopter) includes two gas turbine engines. When a twin-engine rotorcraft operates in an All Engine Operative (AEO) mode, the twin gas turbine engines benefit from matching load power between engines to help reduce mechanical fatigue and improve flight handling quality of the rotorcraft. Conventional methods of twin engine load power sharing may be sluggish.

SUMMARY

A load power sharing control system for a twin-engine rotorcraft having a first gas turbine engine and a second gas turbine engine is provided according to various embodiments. The load power sharing control system comprises a first full authority digital engine control ("FADEC") comprising, a first outer loop control module to determine a torque request based at least in part on a real-time collective lever angle command, a first inner loop control module to receive the torque request from the first outer loop control module, to determine fuel flow and inlet guide vane schedules based at least in part on the received torque request and to command the first gas turbine engine according to the determined fuel flow and inlet guide vane schedules, a first power sharing module to receive a first load signal from the first gas turbine engine and output a power turbine torque signal (Qpt_LS) to the first outer loop control module and a power turbine speed signal (NP_LS) to the first inner loop control module and a second FADEC comprising a second outer loop control module to determine the torque request based at least in part on a real-time collective lever angle command, a second inner loop control module to receive the torque request from the second outer loop control module, to determine fuel flow and inlet guide vane schedules based at least in part on the received torque request and to command the second gas turbine engine according to the determined fuel flow and inlet guide vane schedules, and a second power sharing module to receive a second load signal from the second gas turbine engine and output a power turbine torque signal (Qpt_LS) to the second outer loop control module and the power turbine speed signal (NP_LS) to the second inner loop control module.

Moreover, in various aspects, an input of the first power sharing module and the second power sharing module is a filtered error of the first load signal and the second load signal and wherein the load power sharing control system further comprises an engine configured to change load power in response to commands from at least one of the first FADEC or the second FADEC.

Moreover, in various aspects, the first and second load signals are selected based on flight conditions, engine operation modes, and sensor status.

Moreover, in various aspects, the first load signal comprises a local power turbine torque signal (Qpt), a local EGT signal, a local power turbine horsepower signal (HP), or a local gas generator speed signal (NG) and the second load signal comprises a remote power turbine torque signal (Qpt), a remote EGT signal, a remote power turbine horsepower signal (HP), or a remote gas generator speed signal (NG).

The first load signal comprises a remote power turbine torque signal (Qpt), a remote EGT signal, a remote power turbine horsepower signal (HP), or a remote gas generator speed signal (NG) and the second load signal comprises a local power turbine torque signal (Qpt), a local EGT signal, a local power turbine horsepower signal (HP), or a local gas generator speed signal (NG), etc.

Moreover, in various aspects, the first load signal is compared with the second load signal by an adder to generate the filtered error in a form of a difference signal.

Moreover, in various aspects, the difference signal from the adder is input to a signal processing filter of each of the first power sharing module and the second power sharing module, the signal processing filter acting on the difference signal from the adder to generate a first filtered signal and a second filtered signal.

Moreover, in various aspects, the first filtered signal from the signal processing filter is subjected to a first multiplication factor to yield a first product that is output to a power turbine speed (NP) saturation block that outputs a load sharing request signal NP_LS, the first multiplication factor comprising a Gain K_Dnp.

Moreover, in various aspects, the NP_LS signal is added to an original power turbine speed reference NP_ref as a new NP reference/request for each of the first outer loop control module and the second outer loop control module.

Moreover, in various aspects, the second filtered signal from the signal processing filter of each of the first power sharing module and the second power sharing module is subjected to a second multiplication factor to yield a second product, the second multiplication factor comprising Gain_K_dQpt and the second product is output to a power turbine torque (Qpt) saturation block that outputs a load sharing request signal Qpt_LS that is added to a power turbine torque reference Qpt_ref of each of the first outer loop control module and the second outer loop control module as a new QPT reference/request.

A method for load power sharing control of a first gas turbine engine and a second gas turbine engine in a twin-engine rotorcraft is provided according to various embodiments. The method comprises receiving, by a first full authority digital engine control ("FADEC") in the first gas turbine engine and a second FADEC in the second gas turbine engine, a real-time collective lever angle command and a real-time power turbine speed command, generating, by the first FADEC and the second FADEC, a torque request based at least in part on the real-time collective lever angle command and the real-time power turbine speed signal, generating, by the first FADEC and the second FADEC, a fuel flow signal and an inlet guide vane signal based at least in part on the torque request, and sending, by the first FADEC and the second FADEC, the fuel flow signal and the inlet guide vane signal to each of the first gas turbine engine and the second gas turbine engine and receiving and processing, by the first FADEC and the second FADEC, a first load signal and a second load signal to output a power turbine torque signal and a power turbine speed signal.

Moreover, in various aspects, the first load signal comprises a local power turbine torque signal (Qpt), a local EGT signal, a local power turbine horsepower signal (HP), or a local gas generator speed signal (NG) and the second load signal comprises a remote power turbine torque signal (Qpt), a remote EGT signal, a remote power turbine horsepower signal (HP), or a remote gas generator speed signal (NG) and the method further comprises selecting the first and second load signals based on flight conditions, engine operation modes, and sensor status, wherein the method further comprises commanding, by the first FADEC and the second FADEC, an engine to change load power.

Moreover, in various aspects, the first load signal comprises a remote power turbine torque signal (Qpt), a remote EGT signal, a remote power turbine horsepower signal (HP), or a remote gas generator speed signal (NG) and the second load signal comprises a local power turbine torque signal (Qpt), a local EGT signal, a local power turbine horsepower signal (HP), or a local gas generator speed signal (NG), and the method further comprises selecting the first and second load signals based on flight conditions, engine operation modes, and sensor status.

Moreover, in various aspects, processing the first load signal and the second load signal comprises comparing the first load signal with the second load signal by an adder to generate a filtered error in a form of a difference signal.

Moreover, in various aspects, the difference signal from the adder is input to a signal processing filter of each of the first power sharing module and the second power sharing module, the signal processing filter acting on the difference signal from the adder to generate a first filtered signal and a second filtered signal.

Moreover, in various aspects, the first filtered signal from the signal processing filter is subjected to a first multiplication factor to yield a first product that is output to a power turbine speed (NP) saturation block that outputs a load sharing request signal NP_LS, the first multiplication factor comprising a Gain K_Dnp.

Moreover, in various aspects, the NP_LS signal is added to an original power turbine speed reference NP_ref as a new NP reference/request for each of a first outer loop control module and a second outer loop control module.

Moreover, in various aspects, the second filtered signal from the signal processing filter of each of the first power sharing module and the second power sharing module is subjected to a second multiplication factor to yield a second product, the second multiplication factor comprising Gain_K_dQpt and the second product is output to a power turbine torque (Qpt) saturation block that outputs a load sharing request signal Qpt_LS that is added to a power turbine torque reference Qpt_ref of each of the first outer loop control module and the second outer loop control module as a new QPT reference/request.

A twin-engine rotorcraft having a first gas turbine engine and a second gas turbine engine is provided according to various embodiments. The twin-engine rotorcraft comprises a first control system in communication with the first gas turbine engine, the first control system comprising a first computer processor configured to receive a collective lever angle signal and a power turbine speed signal, generate a torque request based at least in part on the collective lever angle signal and the power turbine speed signal, generate a fuel flow signal and an inlet guide vane signal based at least in part on the torque request, send the fuel flow signal and the inlet guide vane signal to control a torque of first gas turbine engine, send a torque signal to modify the torque request, send a speed signal to modify the power turbine speed signal and a second control system in communication with the second gas turbine engine, the second control system comprising a second computer processor configured to receive a collective lever angle signal and the power turbine speed signal, generate the torque request based at least in part on the collective lever angle signal and the power turbine speed signal, generate a fuel flow signal and the inlet guide vane signal based at least in part on the generated torque request, send the fuel flow signal and the inlet guide vane signal to control a torque of first gas turbine engine, send the torque signal to modify the torque request, and send the speed signal to modify the power turbine speed signal.

Moreover, in various aspects, each of the first control system and the second control system include a power sharing module.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Furthermore, any reference to singular includes plural embodiments, and any reference to more than one component or step may include a singular embodiment or step.

Various embodiments are directed to twin-engine rotorcrafts and load power sharing control systems thereof and methods for load power sharing control for a twin-engine rotorcraft. Such systems and methods may enable asymptotical and faster power matching between a local engine and a remote engine (the twin-engines) of the twin-engine rotorcraft, with the help of cascaded multi-variable control (CMVC) that can manage power demand of each individual engine. As a result, the twin-engine rotorcraft experiences improved flight handling quality and reduced mechanical stress of each engine and the rotor system therein.

Figure 1:
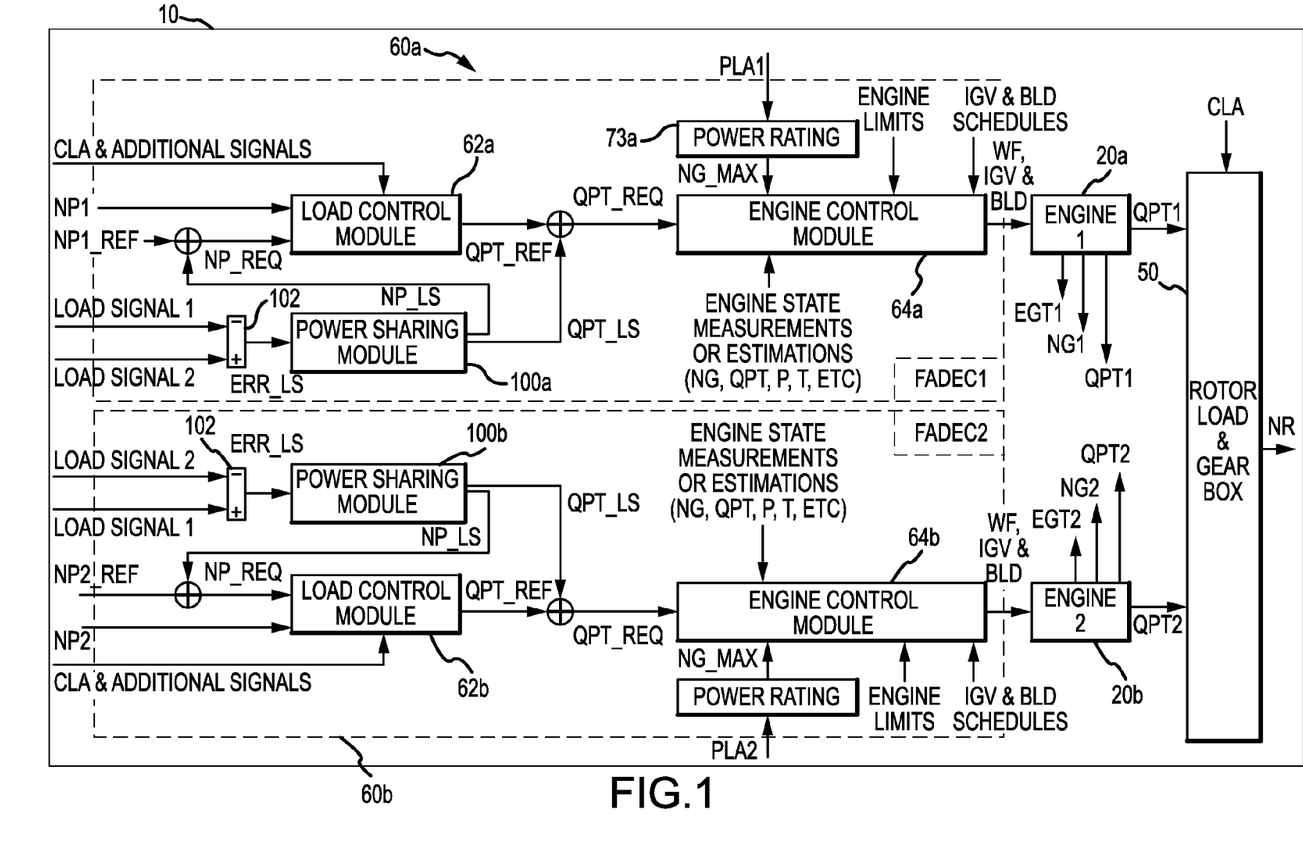
FIG. 1 is a schematic representation of a load power sharing control system for a twin-engine rotorcraft, illustrating a first control system for a first gas turbine engine of the twin-engine rotorcraft and a second control system for a second gas turbine engine of the twin-engine rotorcraft, each of the first and second control systems illustrated as including an outer loop control module, an inner loop control module, and a power sharing module.

Referring now to FIG. 1, according to various embodiments, a rotorcraft 10 (e.g., a helicopter) may include twin engines, a first gas turbine engine (Engine 1 in FIG. 1) 20a and a second gas turbine engine (Engine 2 in FIG. 1) 20b. The first gas turbine engine 20a and the second gas turbine engine 20b drive at least one rotor load and gearbox 50 in the rotorcraft 10. The first gas turbine engine 20a may comprise a "local" engine with the second gas turbine engine 20b comprising a "remote" engine. Alternatively, the first gas turbine engine 20a comprises the "remote" engine and the second gas turbine engine 20b comprises the "local" engine.

Still referring to FIG. 1, according to various embodiments, a first full authority digital engine control ("FADEC1" in FIG. 1) comprises a first control system 60a that controls the first gas turbine engine 20a. A second full authority digital engine control ("FADEC2" in FIG. 1) 20b comprises a second control system 60b that controls the second gas turbine engine 20b. The second control system 60b controls the second gas turbine engine 20b in the same way as the first control system 60a controls the first gas turbine engine 20a as hereinafter described. Accordingly, the elements of the first control system 60a have been and will be referred to herein with the numeral followed by the letter "a" and like elements of the second control system 60b will be referred to with the same numeral followed by the letter "b".

While an exemplary manner of implementing the electronic engine control systems 60a and 60b of FIG. 1 has been illustrated in FIGS. 2-5, one or more elements, processes, and/or devices illustrated in FIGS. 2-5 may be combined, divided, rearranged, omitted, eliminated and/or implemented in any other suitable manner. Further, the exemplary elements of FIGS. 2-5 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, various embodiments may include one or more elements, processes and/or devices in addition to, or instead of, those illustrated in FIGS. 2-5.

Figure 4:
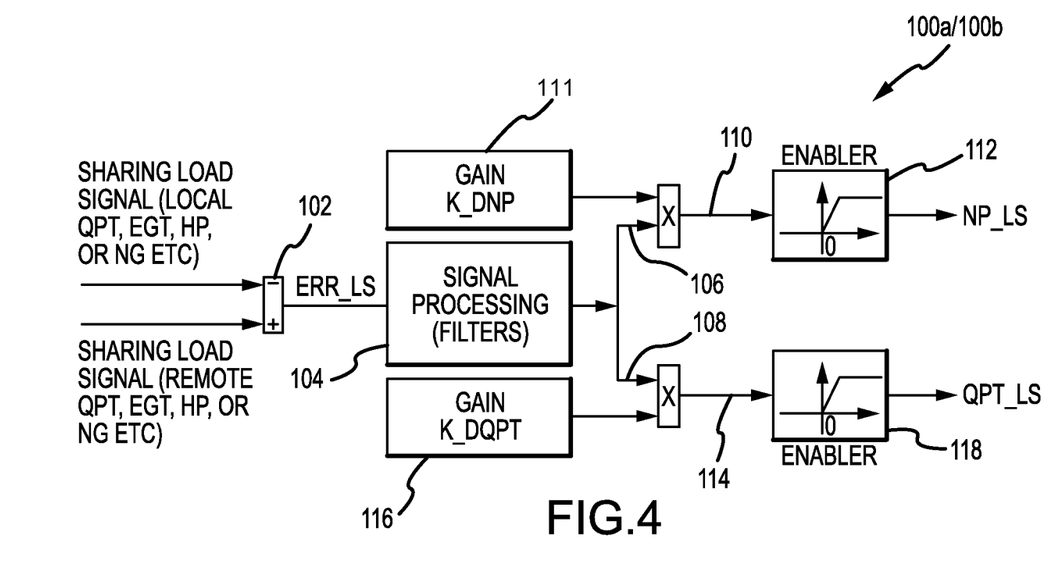
FIG. 4 is a schematic representation of the power sharing module for the load power sharing control system of FIG. 1.

Still referring to FIG. 1, according to various embodiments, the first control system 60a according to various embodiments is described. The first control system 60a may include a first outer loop control module 62a (a first load control module) (FIG. 2) in communication with a first inner loop control module 64a (a first engine control module) (FIG. 5) and, in accordance with various embodiments, a first power sharing module 100a (FIG. 4). The first control systems 60a may comprise any non-transitory, tangible computer readable storage medium having stored thereon computer-executable instructions and one or more computer processors. The first outer and inner loop control modules 62a, 64a are also in communication with the first gas turbine engine 20a and rotor load 50 (e.g., control units and/or sensors of the gas turbine engine 20a and load 50). For example, the first control system 60a may include a plurality of sensors operatively connected to the computer processor. The plurality of sensors may be disposed on the first gas turbine engine 20a and rotor load 50, generating signals indicative of operating parameters, such as, without limitation, a real-time power turbine speed and a real-time estimated power turbine torque.

The first outer loop control module 62a and the first inner loop control module 64a create a cascaded architecture of the first control system 60a in order to manage power demand of the first gas turbine engine 20a and rotor speed of the rotor load 50. The first outer loop control module 62a may be in communication with the rotor load 50, and the first inner loop control module 64a may be in communication with the gas generator section of the first gas turbine engine 20a. In this example, the load 50 is a combination of the gearbox and main rotor of the helicopter, although other loads are certainly possible. The gas generator section and the load 50 are also in communication with each other. In addition, a first load estimation module 66a (FIG. 3) may be in communication with the first outer loop control module 62a, first inner loop control module 64a, gas generator section, and load 50.

The first outer loop control module 62a may receive a signal from the first load estimation module 66a indicative of an estimated power turbine speed (NP_est) in real-time. In addition, the first outer loop control module 62a may receive a desired power turbine speed (NP_req) signal and a signal indicative of a collective lever angle (CLA) command in real-time. Based at least in part on the received signals, the first outer loop control module 62a determines a torque request (Qpt_req) of the power turbine that will match the estimated power turbine speed (NP_est) in real-time to the desired power turbine speed (NP_ref). In so doing, the first outer loop control module 62a may maintain the power turbine at a same rotor speed, or power turbine speed. A signal indicative of the determined torque request (Qpt_req) is then sent from the first outer loop control module 62a to the first inner loop control module 64a (i.e., the first engine control module).

Figure 2:
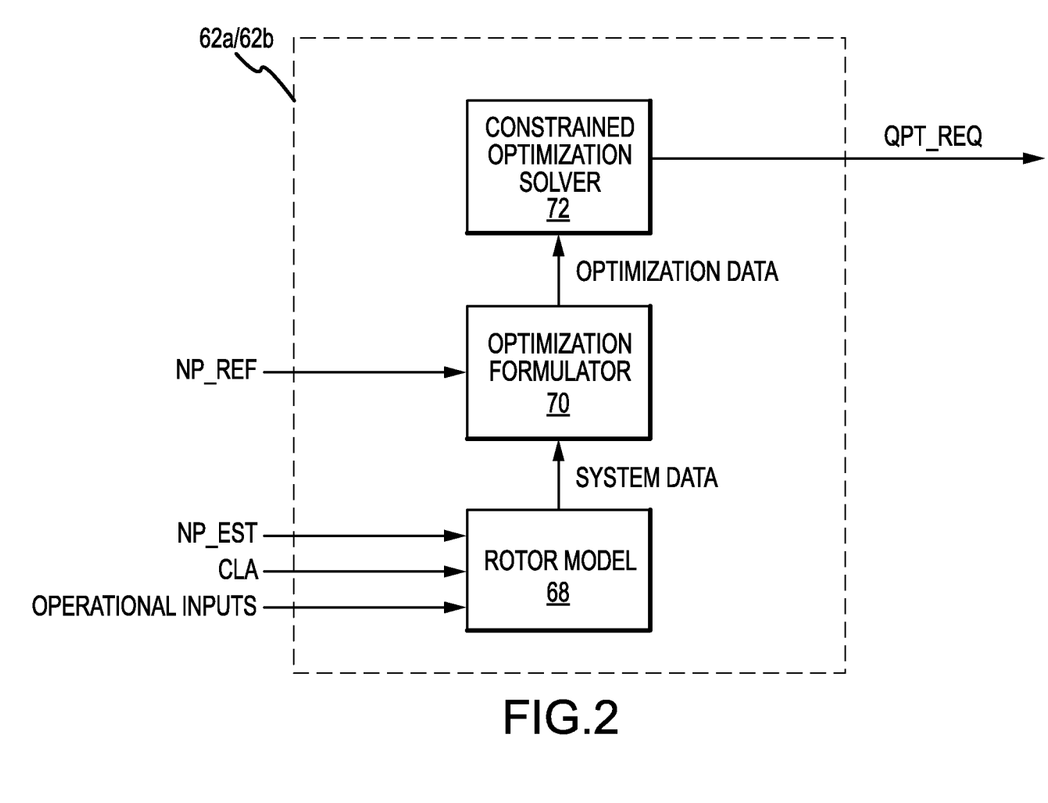
FIG. 2 is a schematic representation of the outer loop control module for the load power sharing control system of FIG. 1.

In order to generate the torque request, the first outer loop control module 62a employs inversion of a dynamic model. For example, as shown in FIG. 2, the first outer loop control module 62a may include a rotor model 68, an optimization formulator 70, and a constrained optimization solver 72. The rotor model 68 may model dynamic behavior of the rotor. It is to be understood that the model 68 may apply to other loads than the rotor, such as, without limitation, a turbopump, an electrical generator, a propeller, or the like. The first outer loop control module 62a may also employ other methods, such as, proportional integral plus feed-forward control methods.

The rotor model 68 may be a linear or nonlinear (e.g., differential algebraic equations, possibly in numerical simulation form), physics and data-based model based at least in part on the estimated power turbine speed (NP_est) and collective lever angle command (CLA). In addition, the model 68 may be based on other inputs, such as operational inputs or environmental conditions including airframe speed, power turbine speed percentage, collective lever angle percentage, and autorotation mode (e.g., autorotation and autorotation recovery). Optimization formulator 70 may receive system data from the rotor model 68, as well as the desired power turbine speed (NP_ref). Based on those inputs, optimization formulator 70 may formulate an optimization problem for which optimization software will be able to solve as a numerically iterative process in real-time.

Constrained optimization solver 72 may receive optimization data from the optimization formulator 70 in order to generate power turbine torque request (Qpt_req). Constrained optimization solver 72 may be a numerical iteration tool which finds a solution to the optimization problem formulated by optimization formulator 70. In addition, constrained optimization solver 72 may be constrained to certain limits, such as, a torque limit of the power turbine 24. In so doing, the first outer loop module 62a utilizes constrained dynamic inversion of the rotor model in real-time to generate the torque request (Qpt_req).

Referring back to FIG. 1, the first inner loop control module 64a receives the torque request signal (Qpt_req) from the first outer loop control module 62a. In addition, the first inner loop control module 64a may receive a signal indicative of an estimated power turbine torque (Qpt_est) in real-time from the load estimation module 66a (the output from the load estimation module input are identified in FIG. 1 as "Engine State Measurements or Estimations"). Other inputs such as, signals indicative of gas generator speed maximum limit (NG_max), gas turbine engine limits, and inlet guide vane (IGV) and stability bleed (BLD) schedules in real-time may also be received by the first inner loop control module 64a.

The gas generator speed maximum limit (NG_max) signal may be sent to the first inner loop control module 64a from a first power rating module 73a. First power rating module 73a receives a power lever angle signal (PLA) to generate gas generator speed maximum limit (NG_max) signal. Since gas generator speed is a function of power lever angle, power rating module 73 may utilize tables to generate the gas generator speed maximum limit (NG_max) signal based on the power lever angle (PLA1) command.

As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

Based at least in part on the received signals, the first inner loop control module 64a determines a fuel flow (WF), inlet guide vane (IGV) schedules, and stability bleed (BLD) schedules of the gas generator section that will deliver the power turbine torque request (Qpt_req) generated by the first outer loop control module 62a. In so doing, the first inner loop control module 62a manages multi-variable controls of the first gas turbine engine 20a to quickly respond to power demand changes. A fuel flow signal (WF) indicative of the determined fuel flow, an inlet guide vane signal (IGV) indicative of the determined inlet guide vane schedules, and a stability bleed signal (BLD) indicative of the determined stability bleed schedules are sent from the first inner loop control module 64a to the gas generator section of the first gas turbine engine 20a. The fuel flow, inlet guide vane positions, and stability bleed valves of the gas generator section are then adjusted according to the signals received from the first inner loop control module 64a.

Figure 5:
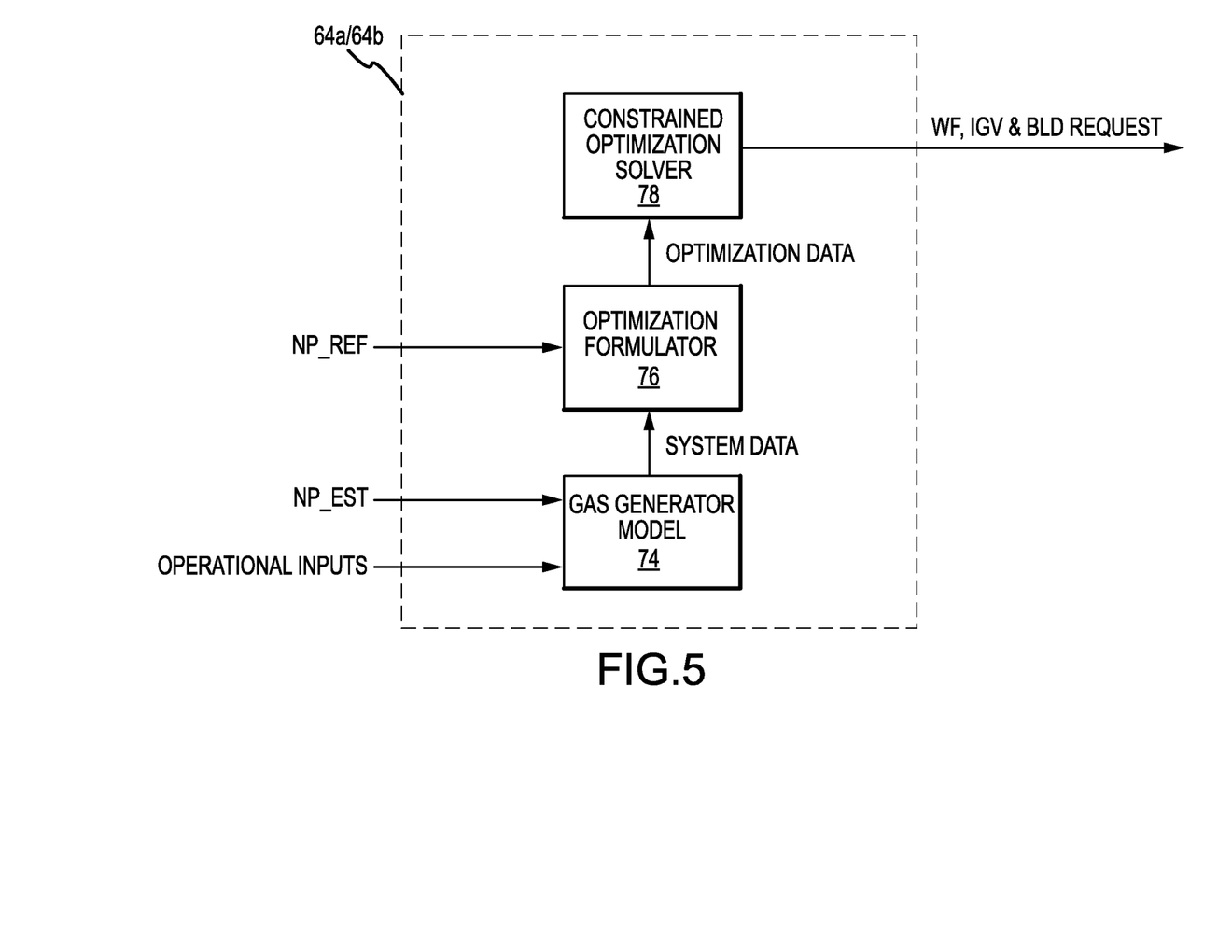
FIG. 5 is a schematic representation of an inner loop control module for the load power sharing control system of FIG. 1.

In order to generate the fuel flow (WF), inlet guide vane schedules (IGV), and stability bleed schedules (BLD), the first inner loop control module 64a employs inversion of a dynamic model. For example, as shown in FIG. 5, the first inner loop control module 64a may include a gas generator model 74, an optimization formulator 76, and a constrained optimization solver 78. The gas generator model 74 may model dynamic behavior of the gas generator. The gas generator model 74 may be a linear or nonlinear (e.g., differential algebraic equations, possibly in numerical simulation form), physics and data-based model based at least in part on the estimated power turbine speed (NP_est) and operational inputs. The operational inputs may include, but not be limited to an altitude of the airframe (ambient pressure over standard day pressure) and a low rotor corrected speed.

Optimization formulator 76 may receive system data from the gas generator model 74, as well as the power turbine torque request (Qpt_req). Based on those inputs, optimization formulator 76 may formulate an optimization problem for which an optimization module will be able to solve as a numerically iterative process in real-time. Constrained optimization solver 78 may receive optimization data from the optimization formulator 76 in order to generate the requested fuel flow, inlet guide vane schedules, and stability bleed schedules (WF, IGV & BLD request). Constrained optimization solver 78 may be a numerical iteration tool which finds a solution to the optimization problem formulated by optimization formulator 76. In addition, constrained optimization solver 72 may be constrained to limits of the first gas turbine engine 20a, such as, without limitation, a rotor speed limit, a compressor stall limit, a lean blowout limit, a temperature limit, a pressure limit, or the like. Real-time implementation of the constrained, inverted dynamic gas generator model 74 into the first inner loop control module 64a generates values for fuel flow, inlet guide vane schedules, and stability bleed schedules that deliver a torque of the power turbine section 24 that is proximate or equal to the torque request (Qpt_req) and within the limits of the first gas turbine engine 20a.

Returning to FIG. 3, the first load estimation module 66a may generate the estimated power turbine speed signal (NP_est) and the estimated power turbine torque signal (Qpt_est) by combining real-time speed sensor and torque sensor measurements (NP, Qpt) with dynamic model estimation. More specifically, the first load estimation module 66a may include a rotor model 67 and feedback correction module 69. The rotor model 67 may be similar to, or the same as, the rotor model 68 of the first outer loop control module 62a, and may send the estimated speed and torque signals (NP_est, Qpt_est) to the feedback correction module 69.

Figure 3:
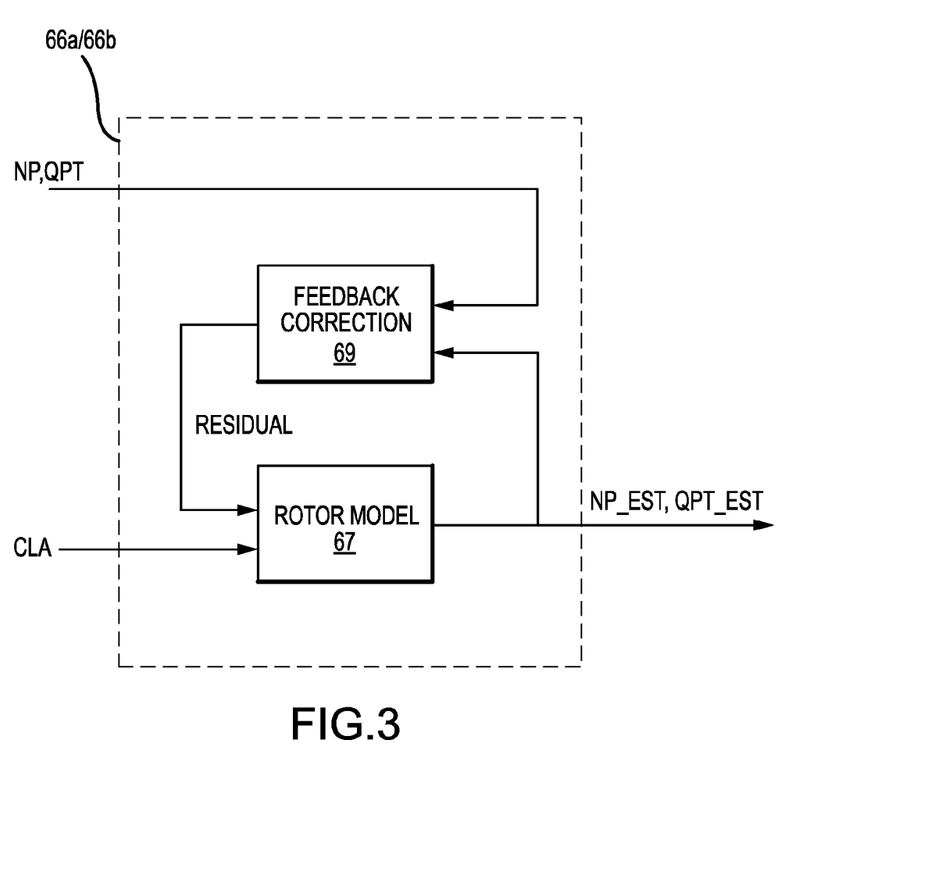
FIG. 3 is a schematic representation of a load estimation module for the load power sharing control system of FIG. 1.

The feedback correction module 69 may compare the speed sensor signal (NP) to the estimated speed signal (NP_est) from the rotor model 67 in order to determine a difference between the two signals (residual). The feedback correction module 69 may also compare the torque sensor signal (Qpt) to the estimated torque signal (Qpt_est) from the rotor model 67 in order to determine a difference between the two signals (residual). The difference between the signals from the sensor measurements and the estimated signals (residual) is then sent to the rotor model 67 in order to dynamically update the rotor model 67 for real-time implementation. Furthermore, the signal processing of real-time speed sensor and torque sensor measurements (NP, Qpt) may include sensor fault detection, isolation and accommodation (FDIA) techniques.

Returning again to FIG. 1 and now to FIG. 4, according to various embodiments and as noted previously, the first control system 60a further comprises a first power sharing module 100a for the first gas turbine engine 20a. An input of the first power sharing module 100a is a filtered error of sharing load signals (Qpt, EGT, NG, etc.) of the first and second gas turbine engines (i.e., the twin engines) 20a and 20b, defined as remote load signal minus local load signal. The choice of load signals depends on flight conditions, engine operation modes, and sensor status among other variables.

A first load signal is compared with a second load signal by an adder 102. The first load signal may include a local power turbine torque signal (Qpt), a local EGT signal, a local power turbine horsepower signal (HP), or a local gas generator speed signal (NG), etc. The second load signal may include a remote power turbine torque signal (Qpt), a remote EGT signal, a remote power turbine horsepower signal (HP), or a remote gas generator speed signal (NG), etc.

The difference signal from the adder 102 is input to a signal processing filter 104 of the first power sharing module 100a. The signal processing filter 104 acts on the difference signal from the adder 102 to generate a first filtered signal 106 and a second filtered signal 108. The first filtered signal 106 from the signal processing filter 104 is subjected to a first multiplication factor to yield a first product 110. The first multiplication factor comprises a Gain K_Dnp 111. The first product 110 is output to a power turbine speed (NP) saturation block 112. An output of the power turbine speed (NP) saturation block 112 (and thus the power sharing module) is a NP_LS signal. The NP_LS signal is for usage of the NP Load Sharing channel (i.e., incrementally modifying the NP reference of the outer loop control module), i.e., the outputted NP_LS signal is added to the original power turbine speed reference NP_ref as a new NP reference/request for the first outer loop control module 62a.

The second filtered signal 108 from the signal processing filter 104 of the first power sharing module 100a is also subjected to a second multiplication factor to yield a second product 114. The second multiplication factor is Gain_K_dQpt 116. The second product 114 is output to a power turbine torque (Qpt) saturation block 118. The output of the power turbine torque (Qpt) saturation block 118 (and thus the power sharing module) is an output Qpt_LS signal. The output Qpt_LS signal is added to the originally calculated power turbine torque reference Qpt_ref of the first outer loop control module 62a as a new QPT reference/request for the first inner loop control module 64a of the control system 60a, i.e., the output Qpt_LS signal is for usage of the Qpt Load Sharing channel (i.e., incrementally modifying the Qpt reference of the first inner loop control module).

The NP saturation block and the Qpt saturation block, called Enablers, ensure that the low-power "remote" engine gradually increases to match the high-power "local" engine, and that there is no reverse operation that may lead to operation or control software failure. If the Qpt Load Sharing channel is added to the NP Load Sharing channel, the twin engine load sharing response may be faster than conventional load power sharing approaches.

Referring again to FIG. 1, according to various embodiments, the second engine control system 60b will now be described. The second engine control system 60b includes a second outer loop control module 62b (a second load control module (FIG. 1)) in communication with a second inner loop control module 64b (a second engine control module) (FIG. 5) and, in accordance with various embodiments, a second power sharing module 100b as will be hereinafter described. The second control system 60b may comprise any non-transitory, tangible computer readable storage medium having stored thereon computer-executable instructions, such as, one or more computer processors. The second outer and inner loop control modules 62b, 64b are also in communication with the second gas turbine engine 20b and rotor load 50 (e.g., control units and/or sensors of the second gas turbine engine 20b and load 50). For example, the second control system 60b may include a plurality of sensors operatively connected to the computer processor. The plurality of sensors may be disposed on the second gas turbine engine 20b and rotor load 50, generating signals indicative of operating parameters, such as, without limitation, a real-time power turbine speed and a real-time estimated power turbine torque.

The second outer loop control module 62b and the second inner loop control module 64b create a cascaded architecture of the second control system 60b in order to manage power demand of the second gas turbine engine 20b and rotor speed of the rotor load 50. The second outer loop control module 62b may be in communication with the rotor load 50, and the second inner loop control module 64b may be in communication with the gas generator section of the second gas turbine engine 20b. In this example, the load 50 is a combination of the power turbine and main rotor of the helicopter, although other loads are certainly possible. The gas generator section and the load 50 are also in communication with each other. In addition, a second load estimation module 66b (FIG. 3) may be in communication with the second outer loop control module 62b, the second inner loop control module 64b, gas generator section, and load 50.

The second outer loop control module 62b may receive a signal from the second load estimation module 66b indicative of an estimated power turbine speed (NP_est) in real-time. In addition, the second outer loop control module 62b may receive a desired power turbine speed (NP_req) signal and a signal indicative of a collective lever angle (CLA) command in real-time. Based at least in part on the received signals, the second outer loop control module 62b determines a torque request (Qpt_req) of the power turbine that will match the estimated power turbine speed (NP_est) in real-time to the desired power turbine speed (NP_ref). In so doing, the second outer loop control module 62b may maintain the power turbine at a same rotor speed, or power turbine speed. A signal indicative of the determined torque request (Qpt_req) is then sent from the second outer loop control module 62b to the second inner loop control module 64b (i.e., the second engine control module).

In order to generate the torque request, the second outer loop control module 62b employs inversion of a dynamic model. For example, as shown in FIG. 2, the second outer loop control module 62b (like the first outer loop control module 62a) may include a rotor model 68, an optimization formulator 70, and a constrained optimization solver 72. The rotor model 68 may model dynamic behavior of the rotor. It is to be understood that the model 68 may apply to other loads than the rotor, such as, without limitation, a turbopump, an electrical generator, a propeller, or the like. The second outer loop control module 62 may also employ other methods, such as, proportional integral plus feed-forward control methods.

The rotor model 68 may be a linear or nonlinear (e.g., differential algebraic equations, possibly in numerical simulation form), physics and data-based model based at least in part on the estimated power turbine speed (NP_est) and collective lever angle command (CLA). In addition, the model 68 may be based on other inputs, such as operational inputs or environmental conditions including airframe speed, power turbine speed percentage, collective lever angle percentage, and autorotation mode (e.g., autorotation and autorotation recovery). Optimization formulator 70 may receive system data from the rotor model 68, as well as the desired power turbine speed (NP_ref). Based on those inputs, optimization formulator 70 may formulate an optimization problem for which an optimization module will be able to solve as a numerically iterative process in real-time.

Constrained optimization solver 72 may receive optimization data from the optimization formulator 70 in order to generate power turbine torque request (Qpt_req). Constrained optimization solver 72 may be a numerical iteration tool which finds a solution to the optimization problem formulated by optimization formulator 70. In addition, constrained optimization solver 72 may be constrained to certain limits, such as, a torque limit of the power turbine 24. In so doing, the outer loop module 62 utilizes constrained dynamic inversion of the rotor model in real-time to generate the torque request (Qpt_req).

Referring back to FIG. 1, the second inner loop control module 64b receives the torque request signal from the second outer loop control module 62b. In addition, the second inner loop control module 64b may receive a signal indicative of an estimated power turbine torque (Qpt_est) in real-time from the second load estimation module 66b. Other inputs, such as, signals indicative of gas generator speed maximum limit (NG_max), gas turbine engine limits, and inlet guide vane (IGV) and stability bleed (BLD) schedules in real-time may also be received by the second inner loop control module 64b.

The gas generator speed maximum limit (NG_max) signal may be sent to the second inner loop control module 64 from a power rating module 73. Power rating module 73 receives a power lever angle signal (PLA) to generate gas generator speed maximum limit (NG_max) signal. As gas generator speed is a function of power lever angle, power rating module 73 may utilize tables to generate the gas generator speed maximum limit (NG_max) signal based on the power lever angle (PLA) command.

Based at least in part on the received signals, the second inner loop control module 64b determines a fuel flow (WF), inlet guide vane (IGV) schedules, and stability bleed (BLD) schedules of the gas generator section that will deliver the power turbine torque request (Qpt_req) generated by the second outer loop control module 62b. In so doing, the second inner loop control module 62b manages multivariable controls of the gas generator section to quickly respond to power demand changes. A fuel flow signal (WF) indicative of the determined fuel flow, an inlet guide vane signal (IGV) indicative of the determined inlet guide vane schedules, and a stability bleed signal (BLD) indicative of the determined stability bleed schedules are sent from the second inner loop control module 64b to the gas generator section of the second gas turbine engine 20b. The fuel flow, inlet guide vane positions, and stability bleed valves of the gas generator section are then adjusted according to the signals received from the second inner loop control module 64b.

In order to generate the fuel flow (WF), inlet guide vane schedules (IGV), and stability bleed schedules (BLD), the second inner loop control module 64b employs inversion of a dynamic model. For example, as shown in FIG. 5, the second inner loop control module 64b may include a gas generator model 74, an optimization formulator 76, and a constrained optimization solver 78. The gas generator model 74 may model dynamic behavior of the gas generator. The gas generator model 74 may be a linear or nonlinear (e.g., differential algebraic equations, possibly in numerical simulation form), physics and data-based model based at least in part on the estimated power turbine speed (NP_est) and operational inputs. The operational inputs may include, but not be limited to an altitude of the airframe (ambient pressure over standard day pressure) and a low rotor corrected speed.

Optimization formulator 76 may receive system data from the gas generator model 74, as well as the power turbine torque request (Qpt_req). Based on those inputs, optimization formulator 76 may formulate an optimization problem for which optimization software will be able to solve as a numerically iterative process in real-time. Constrained optimization solver 78 may receive optimization data from the optimization formulator 76 in order to generate the requested fuel flow, inlet guide vane schedules, and stability bleed schedules (WF, IGV & BLD request). Constrained optimization solver 78 may be a numerical iteration tool which finds a solution to the optimization problem formulated by optimization formulator 76. In addition, constrained optimization solver 72 may be constrained to limits of the gas turbine engine 20, such as, without limitation, a rotor speed limit, a compressor stall limit, a lean blowout limit, a temperature limit, a pressure limit, or the like. Real-time implementation of the constrained, inverted dynamic gas generator model 74 into the second inner loop control module 64b generates values for fuel flow, inlet guide vane schedules, and stability bleed schedules that deliver a torque of the power turbine section 24 that is proximate or equal to the torque request (Qpt_req) and within the limits of the second gas turbine engine 20b.

Referring now to FIG. 3, the second load estimation module 66b may generate the estimated power turbine speed signal (NP_est) and the estimated power turbine torque signal (Qpt_est) by combining real-time speed sensor and torque sensor measurements (NP, Qpt) with dynamic model estimation. More specifically, the second load estimation module 66b may include a rotor model 67 and feedback correction module 69. The rotor model 67 may be similar to, or the same as, the rotor model 68 of the second outer loop control module 62b, and may send the estimated speed and torque signals (NP_est, Qpt_est) to the feedback correction module 69.

The feedback correction module 69 may compare the speed sensor signal (NP) to the estimated speed signal (NP_est) from the rotor model 67 in order to determine a difference between the two signals (residual). The feedback correction module 69 may also compare the torque sensor signal (Qpt) to the estimated torque signal (Qpt_est) from the rotor model 67 in order to determine a difference between the two signals (residual). The difference between the signals from the sensor measurements and the estimated signals (residual) is then sent to the rotor model 67 in order to dynamically update the rotor model 67 for real-time implementation. Furthermore, the signal processing of real-time speed sensor and torque sensor measurements (NP, Qpt) may include sensor fault detection, isolation and accommodation (FDIA) techniques.

Returning again to FIGS. 1 and 4, according to various embodiments, the second control system 60b further comprises a second power sharing module 100b for the second gas turbine engine 20b. The second power sharing module 100b is the same as the first power sharing module 100a. More particularly, the input to the second power sharing module 100b is a filtered error of sharing load signals of the first and second gas turbine engines (i.e., the twin engines) 20a and 20b. The choice of load signals depends on flight conditions, engine operation modes, and sensor status among other variables. A first load signal is compared with a second load signal by the adder 102 of the second power sharing module 100b. The first load signal may include a local power turbine torque signal (Qpt), a local EGT signal, a local power turbine horsepower signal (HP), or a local gas generator speed signal (NG), etc. The second load signal may include a remote power turbine torque signal (Qpt), a remote EGT signal, a remote power turbine horsepower signal (HP), or a remote gas generator speed signal (NG), etc.

The difference signal from the adder 102 is input to the signal processing filter 104 of the second power sharing module. The signal processing filter 104 acts on the difference signal from the adder 102 to generate the first filtered signal 106 and the second filtered signal 108. The first filtered signal 106 from the signal processing filter 104 is subjected to a first multiplication factor to yield a first product 110. The first multiplication factor comprises a Gain K_Dnp 111. The first product 110 is output to the power turbine speed (NP) saturation block 112 of the second power sharing module. An output of the power turbine speed (NP) saturation block 112 is output NP_LS signal. The output NP_LS signal is for usage of the NP Load Sharing channel (i.e., incrementally modifying the NP reference of the outer loop control module) i.e., the output NP_LS signal is added to the original power turbine speed reference NP_ref as a new NP reference/request for the second outer loop control module 62b.)

The second filtered signal 108 from the signal processing filter 104 is also subjected to a second multiplication factor to yield a second product 114. The second multiplication factor is Gain_K_dQpt. The second product is output to a power turbine torque (Qpt) saturation block 118. The output of the power turbine torque (Qpt) saturation block is an output Qpt_LS signal.

The output Qpt_LS signal is added to the originally calculated power turbine torque reference Qpt_ref of the second outer loop control module as a new QPT reference/request for the second inner loop control module 64b of the second control system 60b, i.e., the output Qpt_LS signal is for usage of the Qpt Load Sharing channel (i.e., incrementally modifying the Qpt reference of the second inner loop control module).

As noted previously, the NP saturation block 112 and the Qpt saturation block 118, called Enablers, ensure that the low-power engine (the local or remote engine) gradually increases to match the high-power engine (the local or remote engine), and that there is no reverse operation that may lead to operation or control software failure. The Qpt_LS and NP-LS channels work, respectively, similar to proportional and integral control mechanisms for the purpose of twin-engine load sharing according to various embodiments. The two signals, Qpt_LS and NP_LS sent out by each of the first and second power sharing modules 100a and 100b is integrated with the Cascaded Multi-Variable Control (CMVC) for twin-engine rotorcrafts.

Figure 6:
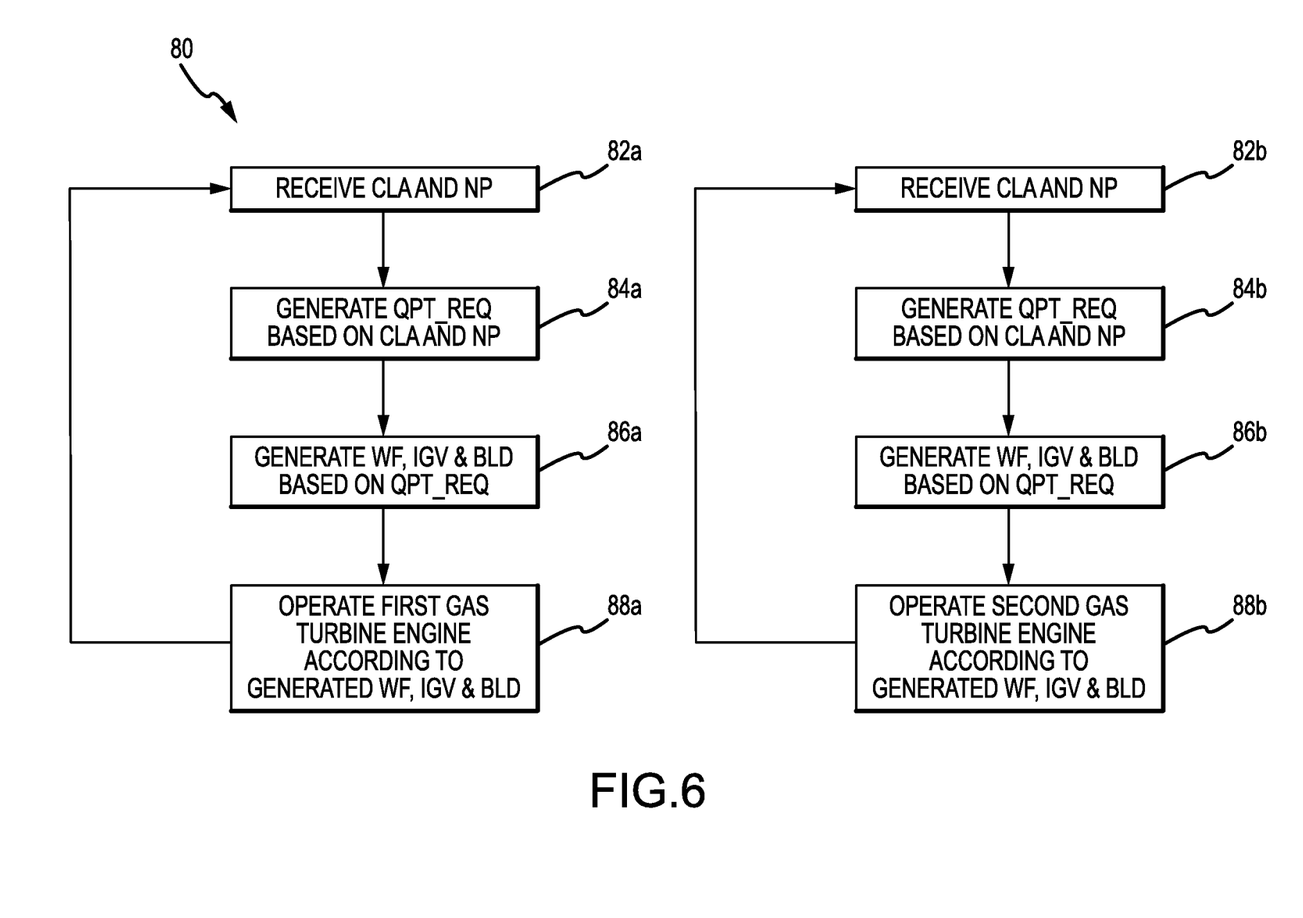
FIG. 6 is a flow diagram for methods for load power sharing control for a twin-engine rotorcraft in accordance with various embodiments.

Turning now to FIG. 6, with continued reference to FIGS. 1 through 5, an exemplary integrated method 80 for of load power sharing for twin engine rotorcrafts is described. At block 82a, the first control systems 60a (or computer processor) may receive the real-time collective lever angle command (CLA) and the real-time power turbine speed (NP) signal. The first outer loop control module 62a of control system 60a generates the torque request (Qpt_req) based at least in part on the real-time collective lever angle (CLA) command and the real-time power turbine speed (NP) signal, at block 84. At block 86a, the first inner loop control modules 64 of control systems 60a generates the fuel flow (WF), the inlet guide vane (IGV), and the stability bleed (BLD) signals based at least in part on the generated torque request (Qpt_req) by the first outer loop control module 62a. The first gas turbine engine 20a is operated according to the generated fuel flow (WF), inlet guide vane (IGV), and stability bleed (BLD) signals. More specifically, the first inner loop control module 64a sends the fuel flow, inlet guide vane, and stability bleed signals to the gas generator section of the first gas turbine engine 20a in order to control the torque output of the power turbine section 24.

At block 82b, the second control system 60b (or computer processor) may receive the real-time collective lever angle command (CLA) and the real-time power turbine speed (NP) signal. The second outer loop control module 62b of control system 60b generates the torque request (Qpt_req) based at least in part on the real-time collective lever angle (CLA) command and the real-time power turbine speed (NP) signal, at block 84b. At block 86b, the second inner loop control module 64b of second control system 60b generates the fuel flow (WF), the inlet guide vane (IGV), and the stability bleed (BLD) signals based at least in part on the generated torque request (Qpt_req) by the second outer loop control module 62b. The second gas turbine engine 20b is operated according to the generated fuel flow (WF), inlet guide vane (IGV), and stability bleed (BLD) signals. More specifically, the second inner loop control module 64b sends the fuel flow, inlet guide vane, and stability bleed signals to the gas generator section of the second gas turbine engine 20b in order to control the torque output of the power turbine section 24 and to match the power of the first gas turbine engine 20a.

From the foregoing, it can be seen that the teachings of this disclosure can find industrial application in any number of different situations, including but not limited to, gas turbine engines. Such engines may be used, for example, on twin-engine aircraft for generating thrust, or in land, marine, or aircraft applications for generating power.

The described disclosure provides a cascaded architecture of a multi-variable control system for twin gas turbine engine (e.g., turboshaft engine) integrated with a method for controlling equal load power between the twin engines. The disclosed control system and method allow for twin gas turbine engines to promptly deliver a requested change in power demand during flight maneuvers, while at the same time, minimizing power turbine speed excursion caused by a rotor load at various power levels. The disclosed system and method coordinate multi-variable controls, i.e., fuel flow and ingle guide vane schedules, in order to meet the shared power demand under engine operation limits.

Better flight safety and power matching between the twin engines results and there is less mechanical stress to the powertrain and rotor systems of the rotorcaft. There is also smaller rotor speed excursion during fast load changes and fuel control and inlet guide vane control may be coordinated for pursuing fuel savings or stall margin protection. There is also better flight handing quality and robust performance at various power levels and more power sharing flexibility and thus easier integration with airframe changes.

The present disclosure describes a method for controlling equal load power and its flexible integration with CMVC for twin engines in AEO mode. Various embodiments enable the lower-power engine to gradually increase to match the high-power engine, without a reverse operation that may lead to operation or control system failure. Various embodiments deliver faster power matching dynamic response but also provide more flexible options than conventional methods for load power sharing for twin engines of rotorcrafts. While the present disclosure has been described with respect to twin engines of rotorcrafts, it is to be understood that various embodiments may provide benefits in ground plants operated by multiple turboshaft engines.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A load power sharing control system for a twin-engine rotorcraft having a first gas turbine engine and a second gas turbine engine, the load power sharing control system comprising:

a first full authority digital engine control ("FADEC") comprising one or more first processors in communication with the first gas turbine engine, the one or more first processors comprising:

a first outer loop control module to determine a torque request based at least in part on a real-time collective lever angle command, a first inner loop control module to receive the torque request from the first outer loop control module, to determine fuel flow and inlet guide vane schedules based at least in part on the received torque request and to command the first gas turbine engine according to the determined fuel flow and inlet guide vane schedules, and a first power sharing module to receive a first load signal from the first gas turbine engine and to output a power turbine torque signal (Qpt_LS) to the first outer loop control module and a power turbine speed signal (NP_LS) to the first inner loop control module, wherein the first FADEC is configured to control a torque of the first gas turbine engine based at least in part on the determined fuel flow and inlet guide vane schedules; and a second FADEC comprising one or more second processors in communication with the second gas turbine engine, the one or more second processors comprising:

a second outer loop control module to determine the torque request based at least in part on the real-time collective lever angle command, a second inner loop control module to receive the torque request from the second outer loop control module, to determine fuel flow and inlet guide vane schedules based at least in part on the received torque request and to command the second gas turbine engine according to the determined fuel flow and inlet guide vane schedules, and a second power sharing module to receive a second load signal from the second gas turbine engine and it output the power turbine torque signal (Qpt_LS) to the second outer loop control module and the power turbine speed signal (NP_LS) to the second inner loop control module, wherein the second FADEC is configured to control a torque of the second gas turbine engine based at least in part on the determined fuel flow and inlet guide vane schedules.

2. The load power sharing control system of claim 1, wherein an input of the first power sharing module and the second power sharing module is a filtered error of the first load signal and the second load signal and wherein the load power sharing control system further comprises an engine configured to change load power in response to commands from at least one of the first FADEC or the second FADEC.

3. The load power sharing control system of claim 2, wherein the first and second load signals are selected based on flight conditions, engine operation modes, and sensor status.

4. The load power sharing control system of claim 3, wherein the first load signal comprises a local power turbine torque signal (Qpt), a local EGT signal, a local power turbine horsepower signal (HP), or a local gas generator speed signal (NG) and the second load signal comprises a remote power turbine torque signal (Qpt), a remote EGT signal, a remote power turbine horsepower signal (HP), or a remote gas generator speed signal (NG).

5. The load power sharing control system of claim 3, wherein the first load signal comprises a remote power turbine torque signal (Qpt), a remote EGT signal, a remote power turbine horsepower signal (HP), or a remote gas generator speed signal (NG) and the second load signal comprises a local power turbine torque signal (Qpt), a local EGT signal, a local power turbine horsepower signal (HP), or a local gas generator speed signal (NG), etc.

6. The load power sharing control system of claim 3, wherein the first load signal is compared with the second load signal by an adder to generate the filtered error in a form of a difference signal.

7. The load power sharing control system of claim 6, wherein the difference signal from the adder is input to a signal processing filter of each of the first power sharing module and the second power sharing module, the signal processing filter acting on the difference signal from the adder to generate a first filtered signal and a second filtered signal.

8. The load power sharing control system of claim 7, wherein the first filtered signal from the signal processing filter is subjected to a first multiplication factor to yield a first product that is output to a power turbine speed (NP) saturation block that outputs a load sharing request signal NP_LS, the first multiplication factor comprising a Gain K_Dnp.

9. The load power sharing control system of claim 8, wherein the NP_LS signal is added to an original power turbine speed reference NP_ref as a new NP reference/request for each of the first outer loop control module and the second outer loop control module.

10. The load power sharing control system of claim 7, wherein the second filtered signal from the signal processing filter of each of the first power sharing module and the second power sharing module is subjected to a second multiplication factor to yield a second product, the second multiplication factor comprising Gain_K_dQpt and the second product is output to a power turbine torque (Qpt) saturation block that outputs a load sharing request signal Qpt_LS that is added to a power turbine torque reference Qpt_ref of each of the first outer loop control module and the second outer loop control module as a new QPT reference/request.

11. A method for load power sharing control of a first gas turbine engine and a second gas turbine engine in a twin-engine rotorcraft, the method comprising:
    receiving, by a first full authority digital engine control ("FADEC") in the first gas turbine engine and a second FADEC in the second gas turbine engine, a real-time collective lever angle command and a real-time power turbine speed signal;
    generating, by the first FADEC and the second FADEC, a torque request based at least in part on the real-time collective lever angle command and the real-time power turbine speed signal;
    generating, by the first FADEC and the second FADEC, a fuel flow signal and an inlet guide vane signal based at least in part on the torque request;
    sending, by the first FADEC and the second FADEC, the fuel flow signal and the inlet guide vane signal to each of the first gas turbine engine and the second gas turbine engine;
    receiving and processing, by the first FADEC and the second FADEC, a first load signal and a second load signal to output a power turbine torque signal and a power turbine speed signal; and
    controlling, by the first FADEC and the second FADEC, a torque of the first gas turbine engine and a torque of the second gas turbine engine by adjusting a fuel flow based on the fuel flow signal and by adjusting an inlet guide vane position based on the inlet guide vane signal.

12. The method of claim 11, wherein the first load signal comprises a local power turbine torque signal (Qpt), a local EGT signal, a local power turbine horsepower signal (HP), or a local gas generator speed signal (NG) and the second load signal comprises a remote power turbine torque signal (Qpt), a remote EGT signal, a remote power turbine horsepower signal (HP), or a remote gas generator speed signal (NG) and the method further comprises selecting the first and second load signals based on flight conditions, engine operation modes, and sensor status, wherein the method further comprises commanding, by the first FADEC and the second FADEC, an engine to change load power.

13. The method of claim 11, wherein the first load signal comprises a remote power turbine torque signal (Qpt), a remote EGT signal, a remote power turbine horsepower signal (HP), or a remote gas generator speed signal (NG) and the second load signal comprises a local power turbine torque signal (Qpt), a local EGT signal, a local power turbine horsepower signal (HP), or a local gas generator speed signal (NG), and the method further comprises selecting the first and second load signals based on flight conditions, engine operation modes, and sensor status.

14. The method of claim 11, wherein processing the first load signal and the second load signal comprises comparing the first load signal with the second load signal by an adder to generate a filtered error in a form of a difference signal.

15. The method of claim 14, wherein the difference signal from the adder is input to a signal processing filter of each of a first power sharing module of the first FADEC and a second power sharing module of the second FADEC, the signal processing filter acting on the difference signal from the adder to generate a first filtered signal and a second filtered signal.

16. The method of claim 15, wherein the first filtered signal from the signal processing filter is subjected to a first multiplication factor to yield a first product that is output to a power turbine speed (NP) saturation block that outputs a load sharing request signal NP_LS, the first multiplication factor comprising a Gain K_Dnp.

17. The method of claim 16, wherein the NP_LS signal is added to an original power turbine speed reference NP_ref as a new NP reference/request for each of a first outer loop control module of the first FADEC and a second outer loop control module of the second FADEC.

18. The method of claim 17, wherein the second filtered signal from the signal processing filter of each of the first power sharing module and the second power sharing module is subjected to a second multiplication factor to yield a second product, the second multiplication factor comprising Gain_K_dQpt and the second product is output to a power turbine torque (Qpt) saturation block that outputs a load sharing request signal Qpt_LS that is added to a power turbine torque reference Qpt_ref of each of the first outer loop control module and the second outer loop control module as a new QPT reference/request.

19. A twin-engine rotorcraft having a first gas turbine engine and a second gas turbine engine, the twin-engine rotorcraft comprising:
    a first control system in communication with the first gas turbine engine, the first control system comprising a first computer processor configured to:
        receive a collective lever angle signal and a power turbine speed signal,
        generate a torque request based at least in part on the collective lever angle signal and the power turbine speed signal, generate a fuel flow signal and an inlet guide vane signal based at least in part on the torque request, send the fuel flow signal and the inlet guide vane signal to control a torque of the first gas turbine engine, send a torque signal to modify the torque request;

send a speed signal to modify the power turbine speed signal; and a second control system in communication with the second gas turbine engine, the second control system comprising a second computer processor configured to:

receive a collective lever angle signal and the power turbine speed signal, generate a torque request based at least in part on the collective lever angle signal and the power turbine speed signal, generate a fuel flow signal and the inlet guide vane signal based at least in part on the torque request, send the fuel flow signal and the inlet guide vane signal to control a torque of the second gas turbine engine, send the torque signal to modify the torque request, and send the speed signal to modify the power turbine speed signal.

20. The twin-engine rotorcraft of claim 19, wherein each of the first control system and the second control system include a power sharing module.

* * * * *

UNITED STATES PATENT AND TRADEMARK OFFICE
CERTIFICATE OF CORRECTION

PATENT NO. : 9,500,138 B1
APPLICATION NO. : 14/828367
DATED : November 22, 2016
INVENTOR(S) : Chaohong Cai et al.

Page 1 of 1

It is certified that error appears in the above-identified patent and that said Letters Patent is hereby corrected as shown below:

In the Claims

In Column 16, Line 35, please delete "it" and insert therefor --to--

Signed and Sealed this
Thirty-first Day of January, 2017

Michelle K. Lee
*Director of the United States Patent and Trademark Office*